United States Patent
Heitz et al.

(10) Patent No.: US 9,863,432 B2
(45) Date of Patent: Jan. 9, 2018

(54) FLUID FILTRATION USING SPLINES

(71) Applicant: Hamilton Sundstrand Corporation, Charlotte, NC (US)

(72) Inventors: Steven A. Heitz, Rockford, IL (US); Keith E. Short, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/606,694

(22) Filed: May 26, 2017

(65) Prior Publication Data

US 2017/0260989 A1 Sep. 14, 2017

Related U.S. Application Data

(62) Division of application No. 14/199,483, filed on Mar. 6, 2014, now Pat. No. 9,689,399.

(51) Int. Cl.

| F04D 29/06 | (2006.01) |
|---|---|
| F04D 29/18 | (2006.01) |
| F04D 29/22 | (2006.01) |
| F01D 5/02 | (2006.01) |
| F01D 25/18 | (2006.01) |
| F16C 33/66 | (2006.01) |
| F16C 19/06 | (2006.01) |
| F16C 19/54 | (2006.01) |
| F16N 7/36 | (2006.01) |
| F01M 1/10 | (2006.01) |

(52) U.S. Cl.
CPC ............. *F04D 29/06* (2013.01); *F01D 5/026* (2013.01); *F01D 25/18* (2013.01); *F04D 29/185* (2013.01); *F04D 29/186* (2013.01); *F04D 29/2288* (2013.01); *F16C 33/667* (2013.01); *F16C 33/6677* (2013.01); *F01M 2001/1035* (2013.01); *F16C 19/06* (2013.01); *F16C 19/54* (2013.01); *F16C 2360/44* (2013.01); *F16N 7/363* (2013.01)

(58) Field of Classification Search
CPC .......... F01D 5/026; F01D 25/18; F04D 29/06; F04D 29/2288; F04D 29/186; F04D 29/185; F01M 2001/1035; F16C 33/6677; F16C 33/667; F16C 19/54; F16C 19/06; F16N 7/363

See application file for complete search history.

(56) References Cited

U.S. PATENT DOCUMENTS

| 4,453,784 A | 6/1984 | Kildea et al. |
|---|---|---|
| 7,175,771 B2 | 2/2007 | Bridges |
| 9,689,399 B2 * | 6/2017 | Heitz ................. F04D 29/06 |

FOREIGN PATENT DOCUMENTS

JP 2002201901 A 7/2002

* cited by examiner

*Primary Examiner* — David A Reifsnyder
(74) *Attorney, Agent, or Firm* — Kinney & Lange, P.A.

(57) ABSTRACT

A method for filtering a fluid that includes collecting contaminates in the fluid, passing the fluid from inside an internal cavity of a first shaft through a tight clearance at a spline connection between the first shaft and a second shaft such that the fluid is filtered of contaminates as a result of the tight clearance, and delivering the filtered fluid to a delivery location.

6 Claims, 3 Drawing Sheets

FLUID FILTRATION USING SPLINES

CROSS-REFERENCE TO RELATED APPLICATION(S)

This application is a divisional of U.S. application Ser. No. 14/199,483 filed Mar. 6, 2014, issued as U.S. Pat. No 9,689,399 on Jun. 27, 2017 entitled "Fluid Filtration Using Splines" by Steven A Heitz and Keith E. Short.

BACKGROUND

The presently disclosed embodiments generally relate to an apparatus and method for filtering contaminates from a fluid.

In one example, an engine uses a fluid, such as oil, to provide lubrication between contacting surfaces. The lubrication acts as a film separating the two contacting surfaces, and thus helps with cooling while preventing or minimizing metal fatigue, wear, and excessive heat caused by friction. However, during manufacture, installation, operation and/or repair of engine components, various contaminates may inadvertently be entrained in the engine. Such contaminates can include manufacturing debris (such as metal shavings), machining chips, and wear debris. These contaminates can be difficult to inspect for and remove from the engine, as they often are found in relatively small, inaccessible internal passages of the engine. As a result, when oil is passed over or through engine components these contaminates may become entrained into the oil, which is problematic when this oil is then later delivered to provide lubrication to various other engine components. Specifically, contaminates within the oil can cause damage and even failure to the components receiving the fluid as lubrication.

Therefore, to help ensure components needing lubrication are not damaged and do not fail, the oil should be free of damaging contaminates when delivered. Various prior solutions have included using a separately routed and isolated oil supply, which can be kept free of contaminates, to provide lubrication. However, use of a separate oil supply requires new, additional parts, such as oil passages and reservoirs which increase the weight and both the cost of manufacturing and maintaining the engine. Another prior solution has included installing additional structures within the engine to collect and trap contaminates within the oil. However, installing additional structures again requires adding new, additional parts increasing weight and cost.

SUMMARY

One embodiment of the present invention includes an assembly for filtering a fluid. The assembly includes a first rotatable shaft with a first set of splines. The first rotatable shaft has an internal cavity containing the fluid. Also included is a second rotatable shaft with a second set of splines mated to the first set of splines. The second rotatable shaft includes at least a portion of a supply hole. The first rotatable shaft and the second rotatable shaft are configured to convey the fluid from the internal cavity through a tight clearance between the first set of splines and the second set of splines, to filter the fluid, and then out the supply hole.

Another embodiment includes a method for filtering a fluid. The method includes collecting contaminates in the fluid. The fluid is passed from inside an internal cavity of a first shaft through a tight clearance at a spline connection between the first shaft and a second shaft, such that the fluid is filtered of contaminates as a result of the tight clearance. The filtered fluid is delivered to a delivery location.

Figure 1:
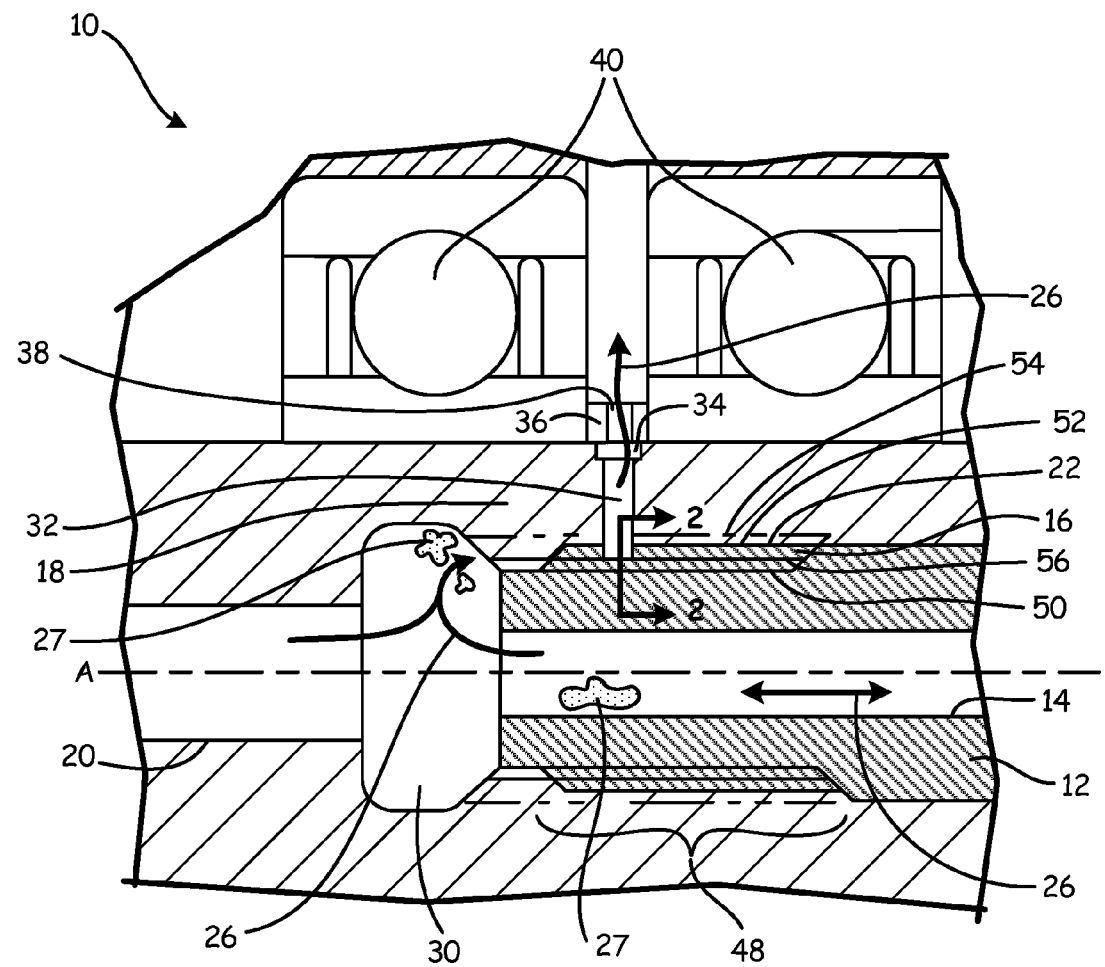
FIG. 1 is a cross-sectional view of an embodiment of a shaft assembly with a spline connection.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Generally, the present embodiments provide a fluid filtered of contaminates that have become entrained in the fluid in order to help prevent damage to, and/or failure of, components to which the fluid is delivered, such as bearings. The fluid is filtered through a combination of both centrifugal forces and by passing the fluid through a spline connection with a tight clearance between mated splines. Contaminates that have become entrained in the fluid are prevented from passing through the tight clearance, which is too small for the contaminates to pass through but large enough for the fluid to pass through. After the fluid has been passed through the tight clearance, it can be delivered to a component to provide lubrication without risk that the lubricated component will be damaged. Significantly, the filtering of the fluid can be accomplished without requiring new, additional parts and/or using a separately routed filtered oil supply.

FIG. 1 is a cross-sectional view of an embodiment of shaft assembly 10. Assembly 10 includes first shaft 12, cavity 14, first set of splines 16, second shaft 18, cavity 20, second set of splines 22, fluid 26 (represented by arrows), contaminates 27, spline undercut 30, supply hole 32, 360° groove 34, bearing spacer 36, hole 38, bearings 40, and centerline A.

First shaft 12 includes cavity 14 and first set of splines 16. Second shaft 18 includes cavity 20 and second set of splines 22. First set of splines 16 is mated to second set of splines 22 (forming spline connection 48, described below with respect to FIG. 2). Mating first set of splines 16 with second set of splines 22 provides a non-rotatable connection between first shaft 12 and second shaft 18, such that rotating shaft 12 or 18 causes the other shaft 12 or 18 to also rotate. In other words, splines 16 and 22 rotationally fix shafts 12 and 18 relative to each other.

Fluid 26 is supplied by a jet (not shown) at approximately atmospheric pressure into cavity 20 of second shaft 18, and flows into cavity 14 of first shaft 12 as a result of a fluid connection between cavities 14 and 20. Fluid 26 can be, for example, oil. Fluid 26 stays at substantially atmospheric pressure while passing through assembly 10. Contaminates 27 may include, for example, manufacturing debris (for instance, metal shavings), machining chips, and/or wear debris. Spline undercut 30 is a depression of an interior surface of second shaft 18 near an end of second shaft 18 and adjacent to second set of splines 22. Supply hole 32 is a conduit which runs through second set of splines 22 on one end and extends to groove 34 on another end. Groove 34 is a circumferential, 360° groove in second shaft 18. Groove 34 is sized such that groove 34 is thinner (shorter width longitudinally with respect to centerline A) than bearing spacer 36, to prevent bearing spacer 36 from dropping into groove 34.

Bearing spacer 36 is located between bearings 40 and assists in keeping bearings 40 in intended locations. Hole 38 is located in bearing spacer 36 and provides an exit to bearings 40 for fluid 26. In the illustrated embodiment bearing spacer 36 includes one hole 38, but in other embodiments there could be multiple holes spaced from each other, such as in a circumferential manner. In embodiments with multiple holes 38, groove 34 may eliminate a need to clock holes 38.

Bearings 40 contact with second shaft 18, providing a substantially friction-free interface and support to second shaft 18, which in turn supports first shaft 12 (connected to second shaft 18 through mated first set of splines 16 and second set of splines 22).

Figure 2:
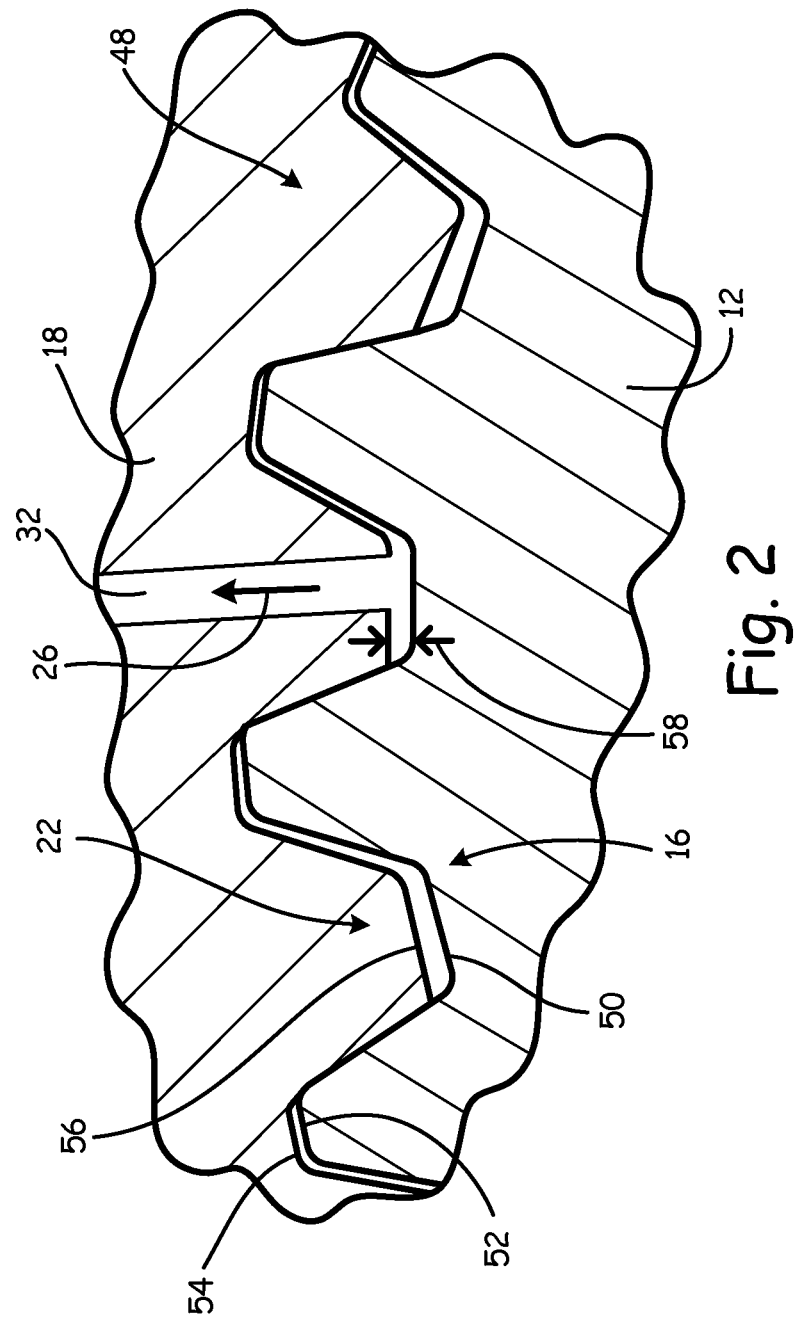
FIG. 2 is an enlarged cross-sectional view of the spline connection, taken along line 2-2 of FIG. 1.

FIG. 2 is a cross-sectional view of a portion of spline connection 48 taken along line 2-2 of FIG. 1. Included in FIG. 2, in addition to that previously shown and described, are spline connection 48, spline tooth roots 50, spline tooth tips 52, spline tooth roots 54, spline tooth tips 56, and tight clearance 58. Spline connection 48 is formed when first set of splines 16 is mated with second set of splines 22, forming the connection between first shaft 12 and second shaft 18. First set of splines 16 is made up of a series of alternating tooth roots 50 and tooth tips 52. In the illustrated embodiment, first set of splines 16 is an external (i.e., radially outwardly protruding) set of splines on first shaft 12. Second set of splines 22 is made up of a series of alternating tooth roots 54 and tooth tips 56. In the illustrated embodiment, second set of splines 22 is an internal (i.e., radially inwardly protruding) set of splines on second shaft 18, however, in other embodiments second set of splines 22 can be an external set of splines while first set of splines 16 can be an internal set of splines. Both first set of splines 16 and second set of splines 22 are straight splines in the illustrated embodiment.

Supply hole 32 extends radially outward from a single tooth tip 56 in the illustrated embodiment. Supply hole 32 is located axially (with respect to centerline A) in an approximate middle of spline connection 48, such that supply hole 32 is spaced from both ends of spline connection 48. Here, supply hole 32 is located at a tooth tip 56, and not a tooth root 54, because tooth roots 54 are closer to the outer periphery of spline connection 48, where contaminates 27 collect due to centrifugal forces (described later). However, in other embodiments, supply hole 32 could be located at various locations along spline connection 48 and multiple supply holes 32 could be included, with the exact number varying depending on the application and/or the size of first set of splines 16 and second set of splines 22. Clearance 58 constitutes the space between a single tooth tip 56 and a single tooth root 50 at spline connection 48. Clearance 58 is the maximum spacing between first set of splines 16 and second set of splines 22 at spline connection 48.

During operation of shaft assembly 10, second shaft 18 rotates, in turn rotating first shaft 12 through spline connection 48. Fluid 26 travels through cavity 20 and enters cavity 14. Cavity 14 begins to fill with fluid 26 until the volume of cavity 14 is filled, or substantially filled, with fluid 26. Fluid 26 then flows from cavity 14 and enters spline undercut 30.

Fluid 26 can also enter spline undercut 30 directly from cavity 20. However, as fluid 26 is passed through assembly 10, contaminates 27 may become entrained in fluid 26, which presents a risk of damage to components to which fluid 26 is delivered, such as bearings 40. For example, spline undercut 30 often contains contaminates 27 which are difficult to inspect for and clean out, and as a result these contaminates 27 may become entrained in fluid 26 present in spline undercut 30. Contaminates 27 entrained in fluid 26 are carried by fluid 26 upstream (i.e., axially, relative to centerline A, before spline connection 48) from clearance 58.

To help prevent contaminates 27 entrained in fluid 26 from damaging components to which fluid 26 is ultimately delivered, contaminates 27 can be filtered out from fluid 26 by shaft assembly 10. After entering spline undercut 30 as previously described, fluid 26 then passes downstream into spline connection 48 and is accelerated to the rotational speed of shafts 12 and 18. At spline connection 48, fluid 26 acts to provide lubrication between first set of splines 16 and second set of splines 22 at spline connection 48, but at the same time fluid 26 is also filtered. The rotation of shafts 12 and 18 creates centrifugal forces which act to push contaminates 27 (which generally have a greater mass than fluid 26) in fluid 26 to an outer periphery of both spline undercut 30 of second shaft 18 and spline connection 48 (the outer periphery of spline connection 48 being where shaft 18 is located). The centrifugal forces also help to keep contaminates 27 at the outer peripheries of both spline undercut 30 and spline connection 48. Additionally, contaminates 27 not forced to the outer peripheries are substantially prevented from passing through spline connection 48 because of clearance 58.

Tight clearance 58 (shown in FIG. 2), between tooth root 50 of first set of splines 16 and tooth tip 56 of second set of splines 22, acts to filter contaminates 27 from fluid 26 as fluid 26 passes through spline connection 48. Clearance 58, is sized such that contaminates 27 that would present a risk of damage to components to which fluid 26 is delivered are prevented from passing through. Thus, clearance 58 is too small for contaminates 27 to pass through, but large enough for fluid 26 to pass through. Clearance 58 in the illustrated embodiment is approximately 0.005 inch (0.013 cm). However, in other applications clearance 58 can range, for example, from approximately 0.001 inch (0.003 cm) to 0.010 inch (0.025 cm). For instance, where clearance 58 is sized at approximately 0.010 inch (0.025 cm) contaminates 27 sized greater than approximately 0.010 inch (0.025 cm) will be filtered from fluid 26. The size of clearance 58 can vary depending on the component to which fluid 26 is to be delivered, and specifically the size of contaminates 27 that can present a risk of damage to components receiving fluid 26.

Consequently, after passing through clearance 58, fluid 26 is filtered and can be substantially free of contaminates 27 when fluid 26 enters supply hole 32. When filtered fluid 26 enters supply hole 32 at spline connection 48, the centrifugal action created by rotating shafts 12 and 18 acts to pump fluid 26 generally radially outward through supply hole 32 to groove 34, and ultimately fluid 26 is ejected out hole 38 and delivered to bearings 40. The flow rate at which fluid 26 is ejected out holes 38 can be adjusted, for example, by selecting a desired area of hole 38.

The combination of centrifugal forces and clearance 58 allows fluid 26 to be delivered to bearings 40 through supply hole 32 with a relatively low risk that contaminates 27 in fluid 26 will damage bearings 40. Significantly, assembly 10 uses the same fluid 26 to lubricate both spline connection 48 and bearings 40.

Figure 3:
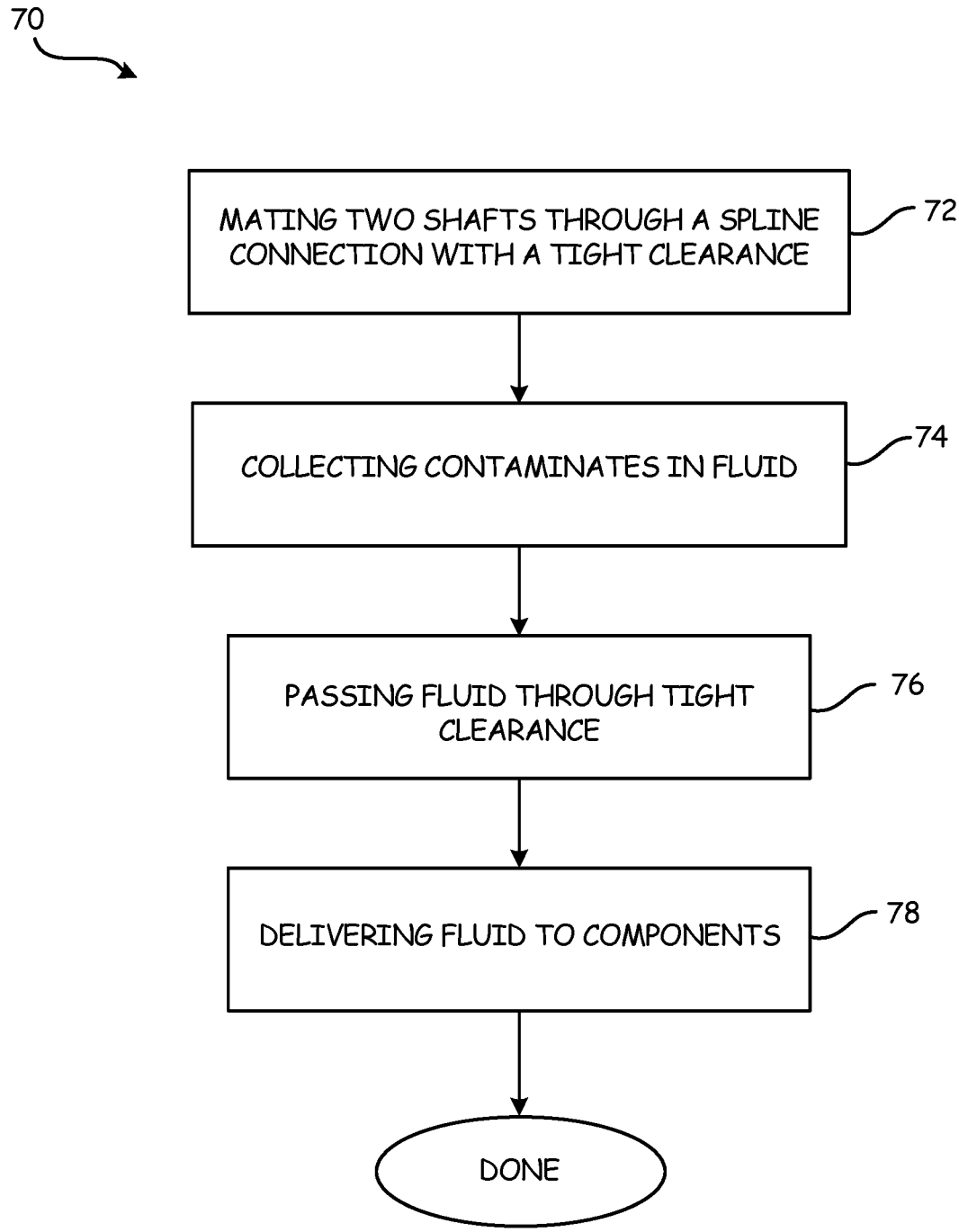
FIG. 3 is a flow chart illustrating an embodiment of a method of filtering a fluid.

FIG. 3 is a flow chart illustrating an embodiment of method 70 for filtering fluid 26. At step 72, first set of splines 16 of first shaft 12 is mated to second set of splines 22 of second shaft 18 to form spline connection 48. Spline connection 48 includes tight clearance 58 between tooth tip 56 of second set of splines 22 and tooth root 50 of first set of splines 16. At step 74, contaminates 27 are collected in fluid 26. Contaminates 27 may be collected in fluid 26 as fluid 26 passes through assembly 10. At step 76, fluid 26 with contaminates 27 is passed through tight clearance 58, which filters fluid 26 of contaminates 27 before fluid 26 enters supply hole 32. Step 78 includes delivering fluid 26 that exits supply hole 32 to a delivery location. Fluid 26 is pumped through supply hole 32 and ultimately ejected out to a desired delivery location. The delivery location may include components that need to receive lubrication, such as bearings 40. As a result, method 70 filters fluid 26 of contaminates 27 that may cause damage at the delivery location.

Assembly 10 can be utilized to filter fluid 26 in various applications. Such applications can include gearboxes and power transmission devices.

Description of Possible Embodiments

The following are non-exclusive descriptions of possible embodiments of the present invention.

An assembly for filtering a fluid, the assembly comprising a first rotatable shaft with a first set of splines, wherein the first rotatable shaft has an internal cavity containing the fluid; and a second rotatable shaft with a second set of splines mated to the first set of splines, wherein the second rotatable shaft includes at least a portion of a supply hole, and wherein the first rotatable shaft and the second rotatable shaft are configured to convey the fluid from the internal cavity through a tight clearance between the first set of splines and the second set of splines, to filter the fluid, and then out the supply hole.

The assembly of the preceding paragraph can optionally include, additionally and/or alternatively, any one or more of the following features, configurations and/or additional components:

The supply hole is positioned at a location where the first set of splines and the second set of splines mate.

The supply hole extends radially outward from a tooth tip of the second set of splines.

Contaminates carried by the fluid upstream from the tight clearance between the first set of splines and the second set of splines.

The contaminates collect at a periphery of the mated first set of splines and the second set of splines, when the first shaft and the second shaft are rotated.

The tight clearance ranges from approximately 0.001 inch (0.003 cm) to approximately 0.010 inch (0.025 cm).

The tight clearance ranges from approximately 0.004 inch (0.010 cm) to approximately 0.006 inch (0.015 cm).

The first set of splines and the second set of splines are both straight splines.

The first set of splines are external splines and the second set of splines are internal splines.

A method for filtering a fluid, the method comprising collecting contaminates in the fluid; passing the fluid from inside an internal cavity of a first shaft through a tight clearance at a spline connection between the first shaft and a second shaft, such that the fluid is filtered of contaminates as a result of the tight clearance; and delivering the filtered fluid to a delivery location.

The method of the preceding paragraph can optionally include, additionally and/or alternatively, the following techniques, steps, features and/or configurations:

Directing contaminates to a periphery of the spline connection through a centrifugal action.

Delivering the filtered fluid to the delivery location through a supply hole in the second shaft.

Delivering the filtered fluid to the delivery location comprises delivering the filtered fluid to a bearing.

Maintaining the fluid at approximately atmospheric pressure.

The fluid is filtered of contaminates sized greater than approximately 0.010 inch (0.025 cm).

Any relative terms or terms of degree used herein, such as "generally", "substantially", "tight" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for filtering a fluid, the method comprising:
   collecting contaminates in the fluid;
   passing the fluid from inside an internal cavity of a first shaft through a tight clearance at a spline connection between the first shaft and a second shaft, such that the fluid is filtered of contaminates as a result of the tight clearance; and
   delivering the filtered fluid to a delivery location.

2. The method of claim 1, further comprising directing contaminates to a periphery of the spline connection through a centrifugal action.

3. The method of claim 1, further comprising delivering the filtered fluid to the delivery location through a supply hole in the second shaft.

4. The method of claim 1, wherein delivering the filtered fluid to the delivery location comprises delivering the filtered fluid to a bearing.

5. The method of claim 1, further comprising maintaining the fluid at approximately atmospheric pressure.

6. The method of claim 1, wherein the fluid is filtered of contaminates sized greater than approximately 0.010 inch (0.025 cm).

* * * * *